Patented Jan. 7, 1936

2,026,668

UNITED STATES PATENT OFFICE 2,026,668

HYDROAROMATIC ALCOHOL

Herman Alexander Bruson and Lloyd W. Covert, Philadelphia, Pa., assignors to Röhm & Haas Company, Philadelphia, Pa.

No Drawing. Application October 27, 1934, Serial No. 750,279

15 Claims. (Cl. 260—153)

This invention relates to hydrogenation products of nuclear tertiary alkylated phenols having at least 8 carbon atoms in the tertiary alkyl group; said hydrogenation products being new compounds consisting of hydroaromatic secondary alcohols containing a nuclear tertiary alkyl group of at least 8 carbon atoms.

More particularly this invention deals with the preparation of wax-like or viscous, oily bodies by the nuclear hydrogenation of the monohydric or polyhydric phenols obtained by condensing tertiary olefines having at least 8 carbon atoms with phenols and acid catalysts such as sulfuric acid.

We have found namely, that the tertiary alkyl phenols such as $\alpha,\alpha,\gamma,\gamma$-tetramethylbutylphenol, tertiary-iso-duodecylphenol, tertiary-iso-hexadecylphenol and the corresponding cresols, xylenols, resorcinols, guaiacols, and naphthols, obtainable respectively from the tertiary olefines such as di-isobutylene, tri-isobutylene, tetra-isobutylene, beta-dibutylene, and di-isoamylene, by condensation with phenols in the presence of acidic catalysts, preferably sulfuric acid; upon treatment with hydrogen under high pressure and at elevated temperatures in the presence of active, finely divided hydrogenation catalysts such as finely divided nickel, give the corresponding nuclear tertiary alkyl hydroaromatic secondary alcohols having very useful, and in many cases, novel properties. For example, they are colorless, practically odorless liquids or low melting waxes which are insoluble in water but readily soluble in petroleum oils, fatty glycerides, and in most organic solvents. Moreover they are miscible and compatible with a great many organic plastic materials such as rubber, paraffin, natural and synthetic resins, cellulose esters and cellulose ethers. Because of their high boiling points, low vapor pressure, pale color, light-fastness, freedom from rancidity, they are useful as plasticizers for coating and molding compositions, and as lubricants for textile fibres or for fine mechanisms such as watches. Chemically they are useful as intermediates for preparing long-chain tertiary alkyl adipic acids by oxidation with nitric acid for example; also in preparing esters, or as dyestuff intermediates. They are useful as softening agents in rubber compounds, and as ingredients for cosmetics, soaps, and insecticides.

In order to illustrate the preparation of these bodies, the following examples are given:

Example 1

(A) 200 grams of $\alpha,\alpha,\gamma,\gamma$-tetramethylbutylphenol (made by condensing di-isobutylene with phenol in the presence of concentrated sulfuric acid) was mixed with 15 grams of active, finely divided nickel, and heated in a shaking autoclave with hydrogen under pressure at 200° C. for 4 hours. The pressure was 3100 lbs. per square inch. The product $\alpha,\alpha,\gamma,\gamma$-tetramethylbutylcyclohexanol was a colorless, waxy, crystalline compound melting at 56° C. and boiling at 140–142° C/6.5 mm.

(B) A 50% solution of $\alpha,\alpha,\gamma,\gamma$-tetramethylbutylphenol in 95% alcohol was passed together with hydrogen, over 300 ccm. of supported nickel catalyst in a steel chamber, at a rate of approximately 50 grams per hour at a temperature of 250° C., and a pressure of 3100 lbs. per square inch. The said phenol was hydrogenated in a few hours.

Example 2

The condensation product of phenol and tri-isobutylene, made with concentrated sulfuric acid as a catalyst and, herein referred to as tertiary-iso-duodecylphenol, was hydrogenated under the same conditions as described Example 1(A). The product, tertiary-iso-duodecyl cyclohexanol, was a colorless, viscous oil, boiling at 180–200° C/10 mm.

Example 3

A condensation product of phenol and commercial tetra-isobutylene of boiling range 130–180° C/3 mm. said product being a mixture of tertiary-iso-hexadecylphenols melting at 40–50° C., was hydrogenated as described in Example 1(A). The product, a technical mixture of tertiary-iso-hexadecylcyclohexanols was a viscous colorless oil which solidified to a waxy mass.

Example 4

Instead of $\alpha,\alpha,\gamma,\gamma$-tetramethylbutylphenol, the corresponding $\alpha,\alpha,\gamma,\gamma$-tetramethylbutyl-o-cresol (m. p. 49–50° C.) was used as in Example 1(A). The product, $\alpha,\alpha,\gamma,\gamma$-tetramethylbutyl-methylcyclohexanol, was a colorless viscous oil. A similar oil is obtained by the hydrogenation of $\alpha,\alpha,\gamma,\gamma$-tetramethylbutyl-p-cresol, and of $\alpha,\alpha,\gamma,\gamma$-tetramethylbutyl-beta-naphthol, under the same conditions. The hydrogenation product of $\alpha,\alpha,\gamma,\gamma$-tetramethylbutylresorcinol was a colorless balsam.

The preferred temperature range for the hydrogenation of the above tertiary alkylphenols is 100° to 250° C. under a working pressure of 1000 to 3500 lbs. per square inch.

The term "phenols" referred to broadly herein includes polynuclear as well as monocyclic nuclear hydroxy or polyhydroxy aromatic compounds. The alpha, alpha, gamma, gamma tetramethylbutyl group refers to the group

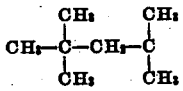

derived from di-isobutylene. The α, α, γ, γ-tetramethylbutylcyclohexanols, particularly are useful as plasticizers for molding resins of the phenol-formaldehyde type since they are colorless, inert to alkalies, or dilute acids, and powerful softeners for this type of resin. They are also efficient as plasticizers for nitrocellulose.

We claim:—

1. A process which comprises heating a tertiary alkyl-phenol having at least 8 carbon atoms in the tertiary alkyl group, with finely divided active nickel, in the presence of hydrogen under pressure in a substantially neutral medium.

2. A process which comprises heating a tertiary alkylphenol having at least 8 carbon atoms in the tertiary alkyl group, with an active hydrogenation catalyst in the presence of hydrogen under pressure in a substantially neutral medium.

3. A process which comprises heating a tertiary alkylphenol with finely divided active nickel in the presence of hydrogen under pressure; said tertiary alkylphenol being a nuclear condensation product of a phenol and a polymer of isobutylene in a substantially neutral medium.

4. A process which comprises heating a tertiary alkylphenol having at least 8 carbon atoms in the tertiary alkyl group, with finely divided active nickel in the presence of hydrogen at about 200° C. and 3100 lbs. per square inch pressure in a substantially neutral medium.

5. A process which comprises heating a tertiary alkylphenol with finely divided nickel in the presence of hydrogen at about 200° C. and 3100 lbs. per square inch pressure; said tertiary alkyl phenol being a nuclear condensation product of a phenol and a polymer of isobutylene in a substantially neutral medium.

6. A process which comprises heating alpha, alpha, gamma, gamma-tetramethylbutyl phenol, with finely divided, active nickel in the presence of hydrogen under pressure.

7. A process which comprises heating tertiary iso-duodecylphenol with finely divided active nickel, in the presence of hydrogen under pressure.

8. A process which comprises heating alpha, alpha, gamma, gamma-tetramethylbutyl-cresol with finely divided active nickel in the presence of hydrogen under pressure.

9. Alpha, alpha, gamma, gamma, tetramethyl-butylcyclohexanol.

10. Alpha, alpha, gamma, gamma, tetramethyl-butylmethylcyclohexanol.

11. Tertiary-isoduodecylcyclohexanol, in which the tertiary-isoduodecyl group is derived from tri-isobutylene.

12. A hydroaromatic secondary alcohol containing a nuclear tertiary alkyl group of at least 8 carbon atoms.

13. A hydroaromatic secondary alcohol containing a nuclear tertiary alkyl group derived from a polymer of isobutylene.

14. A hydroaromatic secondary alcohol containing as a nuclear tertiary alkyl group, the alpha, alpha, gamma, gamma, tetramethylbutyl group.

15. A hydroaromatic secondary alcohol containing as a nuclear tertiary alkyl group, the tertiary radical corresponding to tri-isobutylene.

HERMAN ALEXANDER BRUSON.
LLOYD W. COVERT.